United States Patent [19]
Hirai et al.

[11] Patent Number: 5,586,290
[45] Date of Patent: Dec. 17, 1996

[54] CACHE SYSTEM OF EXTERNAL STORAGE DEVICE

[75] Inventors: Giro Hirai; Mitsuo Sakurai; Kenichi Arika; Toshiyuki Kitami, all of Kawasaki, Japan

[73] Assignee: Fujitsu Limited, Kawasaki, Japan

[21] Appl. No.: 222,390

[22] Filed: Apr. 4, 1994

[30] Foreign Application Priority Data

May 31, 1993 [JP] Japan ................................. 5-129134

[51] Int. Cl.$^6$ ....................................... G06F 12/00
[52] U.S. Cl. ........................... 395/440; 395/468; 395/471; 395/472; 395/835
[58] Field of Search ..................... 395/440, 425, 395/275, 468, 471, 472, 835

[56] References Cited

U.S. PATENT DOCUMENTS

| | | | |
|---|---|---|---|
| 4,506,323 | 3/1985 | Pusic | 395/488 |
| 4,916,605 | 4/1990 | Beardsley et al. | 395/453 |
| 4,920,478 | 4/1990 | Furuya et al. | 395/440 |
| 5,133,060 | 7/1992 | Weber et al. | 395/425 |
| 5,210,866 | 5/1993 | Milligan et al. | 395/575 |
| 5,253,351 | 10/1993 | Yamamoto et al. | 395/425 |
| 5,289,581 | 2/1994 | Berenguel et al. | 395/275 |
| 5,347,642 | 9/1994 | Barratt | 395/425 |
| 5,353,430 | 10/1994 | Lautzenheiser | 395/444 |
| 5,404,487 | 4/1995 | Murata et al. | 395/440 |
| 5,440,686 | 8/1995 | Dahman et al. | 395/164 |

*Primary Examiner*—Christopher B. Shin
*Attorney, Agent, or Firm*—Staas & Halsey

[57] ABSTRACT

In a cache system for executing a cache operation for an external storage device, there is disposed a block number table for stopping a cache function for an external storage device, for which a storage medium is exchanged, when the storage medium of the external storage device is exchanged, and stores the number of data stored from each external storage device into the cache memory when all the data cached from a certain external storage device are purged out by a purging process or an LRU process, so as to restore the cache function of this external storage device.

4 Claims, 9 Drawing Sheets

| DEVICE NUMBER | LOGICAL ADDRESS | | | CACHE MEMORY AREA NUMBER |
|---|---|---|---|---|
| | CYNLINDER NUMBER | HEAD NUMBER | SECTOR NUMBER | |
| | | | | |
| | | | | |
| | | | | |
| | | | | |
| | | | | |
| | | | | |
| | | | | |

| DEVICE NUMBER | LOGICAL ADDRESS | | | CACHE MEMORY AREA NUMBER |
|---|---|---|---|---|
| | CYLINDER NUMBER | HEAD NUMBER | SECTOR NUMBER | |
| | | | | |
| | | | | |
| | | | | |
| | | | | |
| | | | | |

Fig. 6 (b)

| DEVICE NUMBER | 9₁ | 9₂ | | 9m |
|---|---|---|---|---|
| INVALID FLAG | 1 | 0 | | 1 |

Fig. 6 (c)

| DEVICE NUMBER | 9₁ | 9₂ | | 9m |
|---|---|---|---|---|
| NUMBER OF BLOCKS | 5 | 6 | | 3 |

Fig. 7 (a)

| INVALID FLAG | DEVICE NUMBER | LOGICAL ADDRESS | | | CACHE MEMORY AREA NUMBER |
|---|---|---|---|---|---|
| | | C | H | S | |
| 1 | 9₁ | 10 | 8 | 30 | 20 |
| 0 | 9₂ | 40 | 12 | 10 | 26 |
| 1 | 9₁ | 26 | 10 | 40 | 10 |

Fig. 7 (b)

| DEVICE NUMBER | 9₁ | 9₂ | | | 9ₘ |
|---|---|---|---|---|---|
| NUMBER OF BLOCKS | 5 | 6 | | | 3 |

Fig. 8 (a)

| INVALID FLAG | DEVICE NUMBER | SUB-NUMBER | LOGICAL ADDRESS | | | CACHE MEMORY AREA NUMBER |
|---|---|---|---|---|---|---|
| | | | C | H | S | |
| 1 | $9_1$ | a | 10 | 8 | 30 | 20 |
| 1 | $9_2$ | b | 40 | 12 | 10 | 26 |
| 0 | $9_2$ | a | 26 | 10 | 40 | 10 |

Fig. 8 (b)

| DEVICE NUMBER | $9_1$ | | | $9_2$ | | | $9_m$ | | |
|---|---|---|---|---|---|---|---|---|---|
| SUB-NUMBER | a | b | c | a | b | c | a | b | c |
| NUMBER OF BLOCKS | 5 | 0 | 0 | 6 | 2 | 0 | 3 | 0 | 0 |

Fig. 8 (c)

| DEVICE NUMBER | $9_1$ | | | $9_2$ | | | $9_m$ | | |
|---|---|---|---|---|---|---|---|---|---|
| SUB-NUMBER | a | b | c | a | b | c | a | b | c |
| ALLOWANCE /STOP | 1 | 0 | 0 | 0 | 1 | 0 | 1 | 0 | 0 |

CACHE SYSTEM OF EXTERNAL STORAGE DEVICE

BACKGROUND OF THE INVENTION

1. Field of the Invention

This invention relates to a cache system for effecting a cache operation for an external storage device such as a magnetic disk device, an opto-magnetic disk device or a floppy disk device capable of exchanging a storage medium (recording medium). More particularly, the present invention relates to a cache system which prevents transfer of wrong cache data to a CPU (Central Processing Unit) even when a storage medium is exchanged, and which updates automatically and sequentially the content of a data block, etc., stored in the cache memory to the content of the storage medium after the exchange.

2. Description of the Related Art

First of all, a structural example of a cache system according to the prior art will be explained with reference to FIGS. 1(a) and 1(b) of the accompanying drawings in order to have the conventional cache system more easily understood.

Figure 1A:
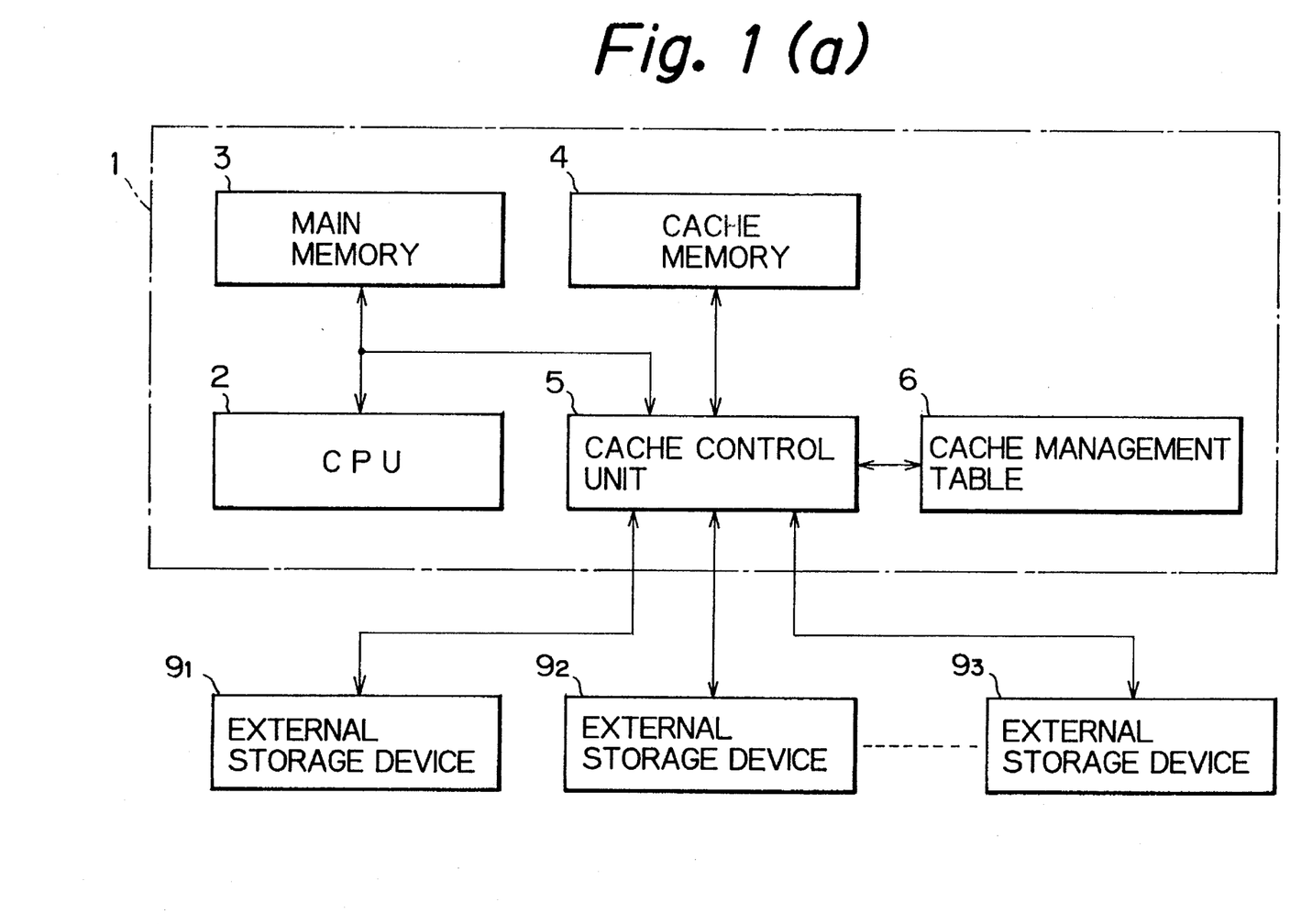
FIG. 1(a) is a block diagram showing a structural example of a cache system according to the prior art.

FIG. 1(a) is a block diagram useful for explaining the principle of a cache system for a conventional external storage device. A host 1 includes a CPU 2, a main memory 3, a cache memory 4, a cache control unit 5 and a cache management table 6.

Figure 1B:
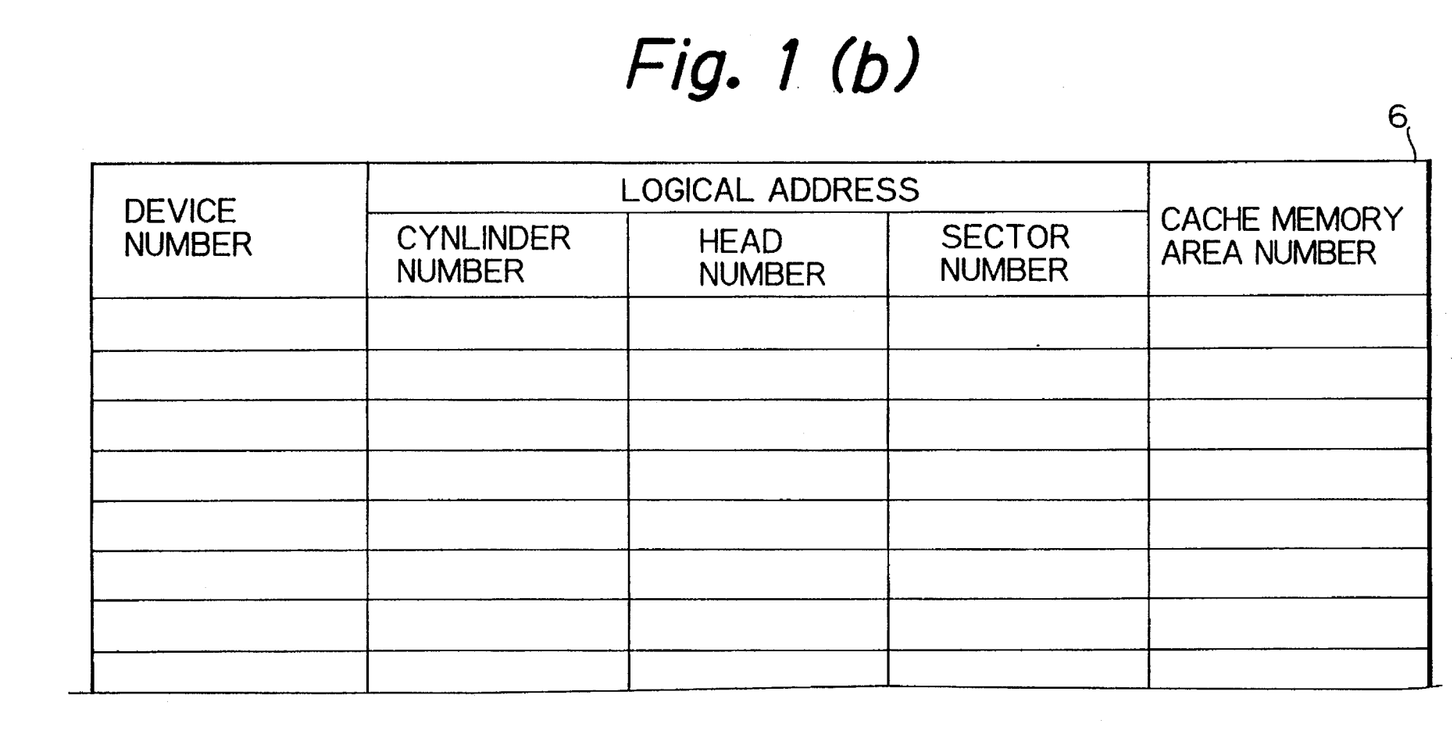
FIG. 1(b) is a conceptual view showing an example of the content of a cache management table in the cache system shown in FIG. 1(a)

FIG. 1(b) conceptually shows an example of the content of the cache management table 6. This cache management table 6 stores a storage position of a data block, which is stored in the cache memory 4, in the external storage device, that is, a device number allocated to the external storage device, a storage position represented by a logical address comprising a cylinder number, a head number and a sector number in the external storage device, and an area number of the cache memory 4 storing this data block in the corresponding way.

When the CPU 2 sends a read instruction for reading out data and a program (hereinafter called merely the "data") stored in the external storage device 9 to the cache control unit 5, this cache control unit 5 looks up the cache management table 6 on the basis of the logical address such as the cylinder number, the sector number, the head number, etc., of the external storage device, for example, and retrieves whether or not the data block containing the data requested by the CPU 2 is stored in the cache memory 4.

If the storage of the required data in the cache memory 4 is identified (or is "hit"), the cache control unit 5 reads out this data by the logical address read out from the cache management table 6 of the cache memory 4, and returns it to the CPU 2. Accordingly, the data stored in the external storage device 9 can be supplied within a short time to the CPU 2 without causing a read delay such as a waiting time (latency time) for positioning of the read head of the external storage device or for the start of revolution of the head. As a result, the processing time can be remarkably reduced as a whole.

When the data block containing the required data is not stored (is not "hit") as a result of retrieval of the cache management table 6 by the cache control unit 5 described above, the data block containing the required data is read out from the external storage device 9 and is supplied to the CPU 2.

Incidentally, the data thus read out is also stored in the cache memory 4 and at the same time, the logical address of the external storage device, from which the data is read out, is registered in the cache management table 6 in such a manner as to correspond to the area number of the cache memory storing this data block, as shown in FIG. 1(b), so that the cache function can be utilized at the time of the next read request.

In this case, if an empty memory area capable of storing the data read out from the external storage device does not exist in the cache memory, a purging process is executed for the data of the cache blocks first written into the cache memory in order to secure a space for writing a new data block, and the data block which is read out afresh and is to be cached is written into this space. This purging process is usually referred to as an LRU (least recently used) process in a computer system.

However, the conventional cache system described above uses the device number of the external storage device and the logical address on the storage medium of this external storage device as the data for designating the data block stored in the cache memory. Accordingly, when the storage medium of the external storage devices is exchanged, the data stored in the memory area corresponding to the area number of the cache memory obtained by the logical address is the data read out from the storage medium before the exchange even if the result of retrieval of the cache management table by the read instruction for the memory medium after the exchange hits and consequently, the data which is different from the data instructed by the read instruction for the storage medium after the exchange is transferred to the CPU.

SUMMARY OF THE INVENTION

In view of the problems described above, it is the first object of the present invention to provide a cache system of external storage devices capable of preventing erroneous cache data from being transferred to the CPU even when a storage medium is exchanged.

It is the second object of the present invention to provide a cache system wherein data blocks stored in a cache memory and the content of a cache management table are updated sequentially and automatically to those after the exchange of a storage medium.

To accomplish the objects described above, the present invention provides a cache system of external storage devices capable of exchanging a memory medium, which comprises external storage devices each capable of exchanging a storage medium; medium exchange detection means for detecting the exchange of the storage medium; a cache memory for storing data blocks read out from the external storage devices; and a cache management table for storing cache information about the data blocks stored in the cache memory; wherein an invalid flag area for storing an invalid flag representing invalidity of the cache function is provided to each of the cache information of the cache management table; the invalid flag is set to the cache information of the cache management table about the data blocks stored from the external storage device, for which the storage medium is exchanged, into the cache memory, when the medium exchange detection means detects the exchange of the storage medium; and when an access instruction to the external storage device arrives, the cache information of the cache management table is retrieved and the cache function is stopped when the invalid flag is set to the cache information.

In the cache system of external storage devices described above, a cache allowance table having invalid flag position for storing an invalid flag representing effectiveness/invalidity of a cache function in such a manner as to correspond to each of the external storage devices is preferably disposed; the invalid flag for stopping the cache function is set to the invalid flag position of the cache allowance table corresponding to the external storage device, for which the storage medium is exchanged, when the exchange of the storage medium is detected by the detection means; and when an access instruction to the external storage device arrives, the cache allowance table is looked up and the cache function for the external storage device, to which the invalid flag is set, is stopped.

Further preferably, the cache system of external storage devices capable of exchanging a storage medium further comprises purging processing means for sequentially purging data from older data when the cache memory becomes full due to stored data, and enabling the cache memory to store new data blocks; and a table of number of blocks equipped with block number areas for recording the number of data blocks stored in such a fashion that when the data block is stored from the external storage device into the cache memory during the period in which the block number area is presently used for the cache function, "1" is added, and when the data block stored during the period is purged out from the cache memory by the purging processing means, "1" is subtracted, whereby the block number areas are so provided as to correspond to the external storage devices, respectively; and wherein, when the number of the data blocks is "0", the invalid flag for the corresponding external storage device of the cache allowance table is reset and the stop of the cache function is released.

Further preferably, the cache system of external storage devices capable of exchanging a storage medium described above has the construction wherein sub-number areas are so disposed as to correspond to the cache information of the cache management table, respectively; when the medium exchange detection means detects the exchange of the storage medium of the external storage device, a different sub-number is put to the cache information on the external storage device and is stored with a device number of the external storage device in the sub-number area; and when an access instruction to the external storage device arrives, the cache information is stored and retrieved by a set of the device number and the sub-number presently used.

The cache system of external storage devices capable of exchanging a storage medium described above has further the construction wherein sub-number areas are so disposed in the cache management table as to correspond to the cache information, respectively; the cache system further comprises purging processing means for sequentially purging data from older data when the cache memory becomes full due to stored data, and enabling the cache memory to store new data blocks; and a table of number of blocks for storing data blocks, which adds "1" when a data block is stored from the external storage device to the cache memory during the period in which the stored block number area is presently used for a cache function, in such a fashion as to correspond to respective external storage device number and sub-number, and subtracts "1" when the data block stored in the period is purged out from the cache memory by the purging processing means; and wherein "1" is added to the block number stored in the block number area when a data block is stored from the external storage device into the cache memory during the period in which the block number area is presently used for the cache function, "1" is subtracted from the block number when the data block stored during the period described above is purged out from the cache memory by the purging processing means, and when the number of the data blocks is "0", the stop of the cache function for the corresponding external storage device is released.

BRIEF DESCRIPTION OF THE DRAWINGS

These and other objects and features of the present invention will be more apparent from the following description of the preferred embodiments when taken in conjunction with the accompanying drawings, wherein.

DESCRIPTION OF THE PREFERRED EMBODIMENTS

Hereinafter, the description of some preferred embodiments according to the present invention will be given with reference to the accompanying drawings.

Figure 2:
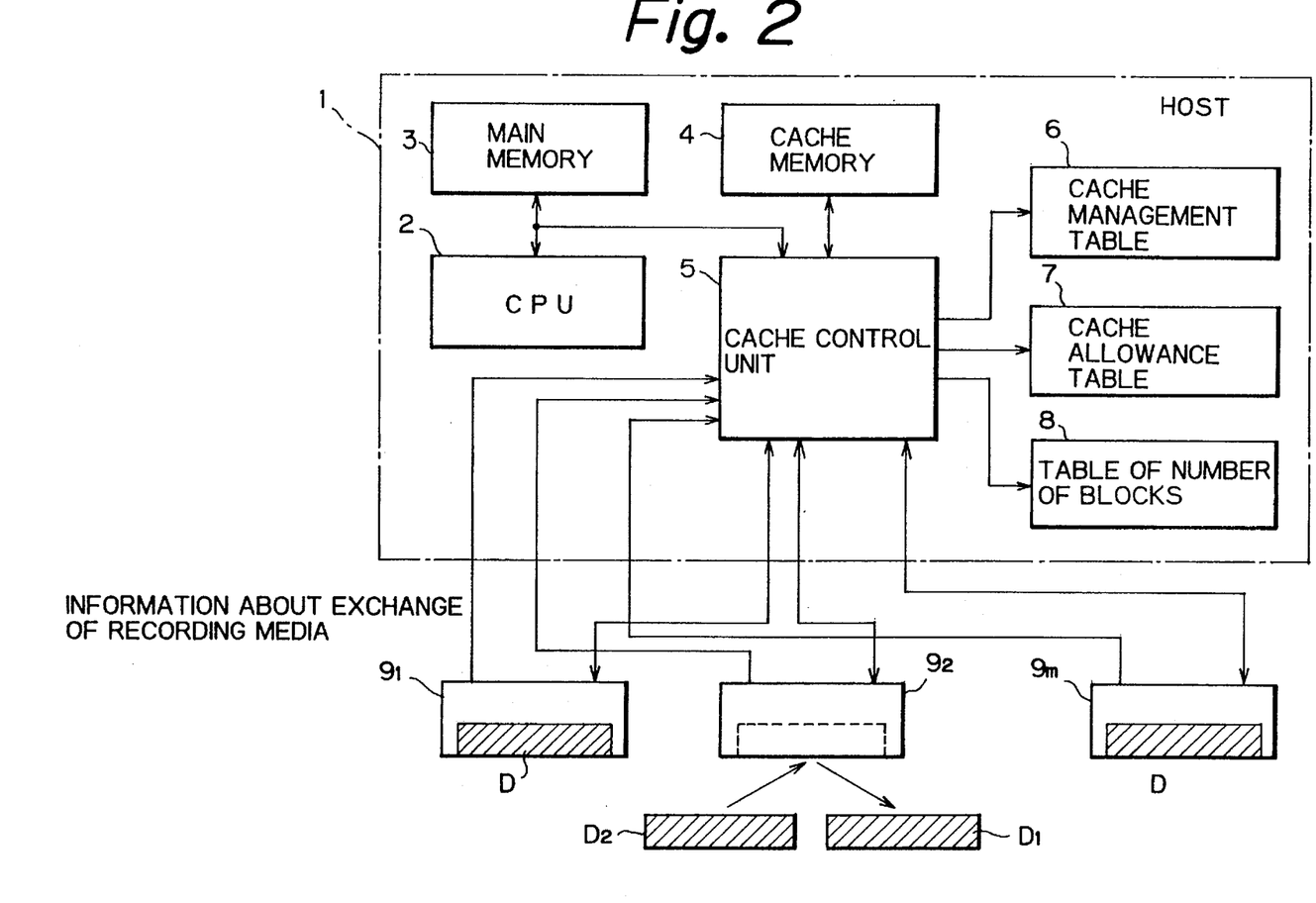
FIG. 2 is a block diagram showing a basic embodiment of a cache system based on the fundamental principle of the present invention.

FIG. 2 is a block diagram showing a basic embodiment of the cache system based on the fundamental principle of the present invention. Incidentally, like reference numerals will be used hereinafter to identify like constituents as in FIG. 1.

Next, the basic construction of the present invention will be explained with reference to the block diagram of FIG. 2. The host 1 has the construction wherein a cache allowance table 7 and a table of the number of blocks 8 are afresh added to the construction of the prior art example shown in FIGS. 1(a) and (b), and the other constituents are represented by the same reference numerals and their explanation will be omitted.

The memory content of the cache management table 6 is not always the same as that of the prior art example already described, and the memory content of each of the cache allowance table 7 and the table 8 of the number of blocks, too, is different from the content of the prior art example.

In the present invention, the host must detect the exchange of the storage medium (i.e., a recording medium or recording media), and a known method can be suitably used for detecting this exchange of the storage medium.

In another example, since the power supply of the external storage device is cut off at least temporarily for exchanging the storage medium, turn-off of the power supply of the external storage device is always monitored by polling from the host side so that the exchange of the storage medium can be detected by this turn-off of the power supply of the external storage device.

Still another method of detecting the exchange of the storage medium comprises disposing means for detecting the exchange of the storage medium on the basis of the change of loading/removal of the storage medium to the external storage device itself, generating an interrupt to the host when the exchange of the storage medium is detected or reporting the exchange at the time of the first access by the host after the exchange of the storage medium.

In FIG. 2, however, it will be assumed that the storage medium exchange information is transmitted from the external storage devices $9_1 \ldots 9_m$ to the host irrespective of the detection method of the exchange, inclusive of the case where the exchange of the storage medium is detected on the host side.

According to the fundamental principle of the present invention, when the cache control unit 5 detects the exchange of the storage medium of the external storage device $9_2$ from $D_1$ to $D_2$ by the storage medium exchange information from this external storage device $9_2$, the use of the cache data stored in the cache management table 6 is inhibited for the data block stored from the storage medium $D_1$ of the external storage device $9_2$ to the cache memory 4, and in this way, the cache function is stopped. In consequence, the error described above can be prevented.

More specifically, it is one of the characterizing features of the present invention that an invalid flag can be set for each cache data of the cache management table 6 corresponding to each data block stored in the cache memory 4, and when the storage medium exchange information is detected from the external storage device $9_2$ for which the storage medium is exchanged, this invalid flag can be set.

When the CPU 2 generates the access instruction to the external storage devices $9_1, 9_2, \ldots 9_m$, the cache control unit 5 looks up this invalid flag of the cache management table 6, and does not use the cache function when the invalid flag is set in such a manner as to correspond to the external storage device to which the access is to be made.

Another characterizing feature of the present invention resides in the construction in which the cache allowance table 7 having flag positions corresponding to the external storage devices $9_1, 9_2, \ldots 9_m$ is disposed in addition to the cache management table 6. The invalid flag is set to the flag position corresponding to the external storage device $9_2$, for which the storage medium $D_1$ is exchanged to $D_2$, and when the CPU 2 generates the access instruction for the external storage devices $9_1, 9_2, \ldots 9_m$, the cache control unit 5 looks up this cache allowance table 7, and does not use the cache function when the invalid flag is set in such a manner as to correspond to the external storage device to which the access is to be made.

When the cache control unit is provided with a purging function for purging the data, which has not been accessed for the longest period, when the cache memory 4 becomes full as has been customary in the art, the data stored in the cache memory 4 is purged from the storage medium $D_1$ before the exchange when the new data from other external storage devices $9_1, \ldots 9_m$ are stored.

When the data block stored in the cache memory 4 disappears from the storage medium $D_1$ before the exchange in this way, non-coincidence between the data block stored in this new storage medium $D_2$ and the data block stored in the cache memory 4 does not occur.

The third feature of the present invention resides in the provision of the table 8 of the number of blocks for sequentially storing the number of blocks stored in the cache memory 4 for each of the external storage devices $9_1, 9_2, \ldots 9_m$, by adding "1" to the numerical value stored in the memory area corresponding to an external storage device when a data block is stored from this external storage device to the cache memory 4, and by subtracting "1" from the numerical value stored in the memory area corresponding to an external storage device when a data block stored from the external storage device into the cache memory 4 is purged out from the cache memory 4 by the purging process.

According to this construction, when the number of blocks stored in the table 8 of the number of blocks in such a manner as to correspond to a certain external storage device 9a is "0", the data block stored from this external storage device 9a into the cache memory 4 does not exist. Accordingly, even when this external storage device 9a is the external storage device $9_2$ for which the storage medium is exchanged and the cache function of which is stopped, there occurs no problem even when the cache function is restored as described above. In the present invention, therefore, even when the invalid flag is set previously to this external storage device $9_2$, the cache function can be made effective by resetting this invalid flag.

The fourth characterizing feature of the present invention resides in the construction in which a sub-number is set besides the device number so that a different sub-number can be used when the storage medium is exchanged, and when write to the cache memory or read from an external storage device is executed, the cache management table is retrieved and updated by the combination of this device number and the sub-number.

When such a sub-number is used, the external storage device is handled as the separate external storage devices before and after the exchange of the storage medium. Accordingly, there can be obtained the effect that the cache function need not be stopped even when the storage medium is exchanged.

However, when a new number is always used as this sub-number, it is necessary to prepare sub-numbers corresponding to the number of the maximum times of the exchange of the storage medium that is expected, and the number of digits becomes so great that resources would be used wastefully.

Accordingly, the fifth feature of the present invention resides in the construction in which the table 8 of the number of blocks having a block number memory area for storing the number of data blocks stored in the cache memory 4 is so disposed as to correspond to each set of the device number and the sub-number, and in which "1" is added to this block number memory area when the data block is stored into the cache memory 4 from the external storage device having the corresponding device number and corresponding to the device number in the set of the sub-number, and in which "1" is subtracted when the data block stored from the corresponding external storage device into the cache memory 4 is purged from the cache memory 4 by the purging process in the same way as described in the foregoing item 3.

The set of the device number and the sub-number, in which the number of the data blocks stored is "0", that is, the set of the device number and the sub-number not having any data block which is stored in the cache memory 4, is used as a new set of the device number and the sub-number after the exchange of the storage medium.

In this way, the number of sub-numbers to be prepared can be extremely reduced.

Figure 3:
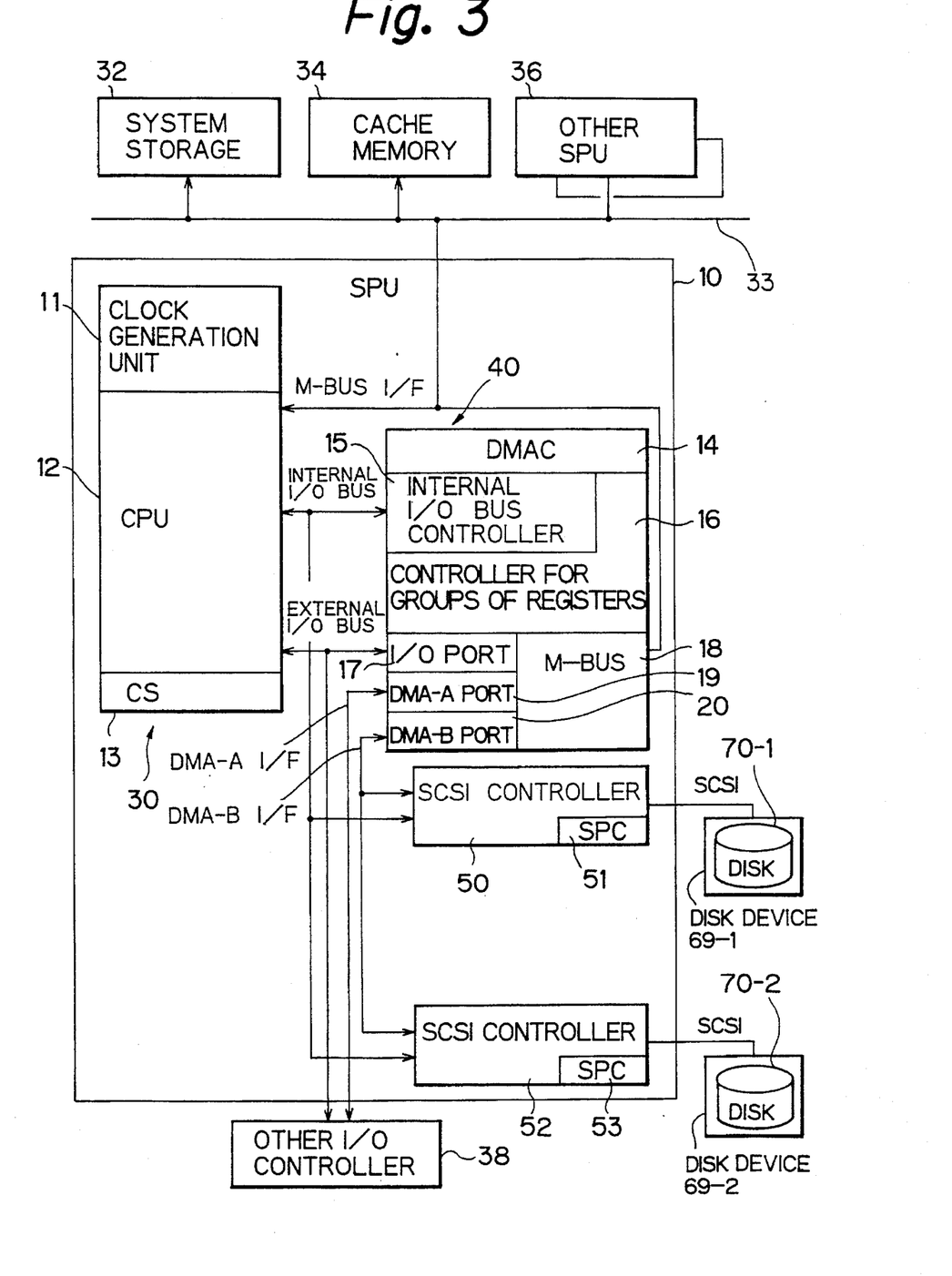
FIG. 3 is a block diagram showing the construction of cache system according to the first embodiment of the present invention.

FIG. 3 is a block diagram showing the construction of a cache system according to the first embodiment of the present invention.

In FIG. 3, 34 denotes a cache memory which has substantially the same structure as that in FIG. 2. 32 denotes a system storage which stores various programs concerning an operating system (OS) for controlling the whole system.

These cache memory 32 and system storage 34 are connected to a system processing unit (SPU) 10 which carrys out a cache operation and data transfer of the whole system in accordance with the operating system, via a system bus 33. The SPU 10 includes a data processor 30, an I/O controller 40 and a small computer system interface (SCSI) controllers 50, 52. Further, some other SPUs 36 are also connected to the SPU 10, via the system bus 33, so as to realize a multiprocessor system.

More specifically, the data processor 30 has a clock generation unit 11 which generates a clock signal that allows all the elements in the cache system to operate in synchronism with each other. Further, the data processor 30 has a CPU 12 which sends various commands to the I/O controller 40, the SCSI controllers 50, 52, and the like, via an internal I/O bus and an external I/O bus, and which receives various data from the I/O controller 40, via a memory-bus interface (M-bus I/F). Further, the data processor 30 has a control storage (CS) 13 which stores programs concerning the command from the CPU 12.

Preferably, the cache management table 6, cache allowance table 7, and table of number of blocks 8, which were described with reference to, are realized by the CPU 12 in the SPU 10.

Further, in FIG. 3, the I/O controller 40 has a number of controllers; e.g., an internal I/O bus controller 15, a direct memory access controller (DMAC) 14, and a controller for groups of registers 16. Further, the system control portion 40 has a number of ports; e.g., an I/O port 17 connected to the external I/O bus, a DMA-A port 19 connected to other I/O controllers 38, a DMA-B port 20 connected to the SCSI controllers 50, 52, and a memory-bus (M-bus) 18 connected to the M-bus I/F.

Further, in FIG. 3, the SCSI controllers 50, 52 has SCSI protocol controllers (SPCs) 51, 53, respectively. The SCSI controllers 50, 52 are connected to disk devices 69-1, 69-2, respectively. The SPC in each of the SCSI controllers is operative to supply a necessary program (e.g., an initial program) stored in a storage medium, i.e., a recording medium (e.g., either one of disks 70-1, 70-2) of the disk device to the control storage 13, by utilizing a predetermined SCSI protocol.

In the first embodiment shown in FIG. 3, it is possible for the cache management table 6, cache allowance table 7, and table of number of blocks 8 to be incorporated into the CPU 12. Therefore, the cache system according to the present invention can be realized without increasing hardware of the system.

Figure 4:
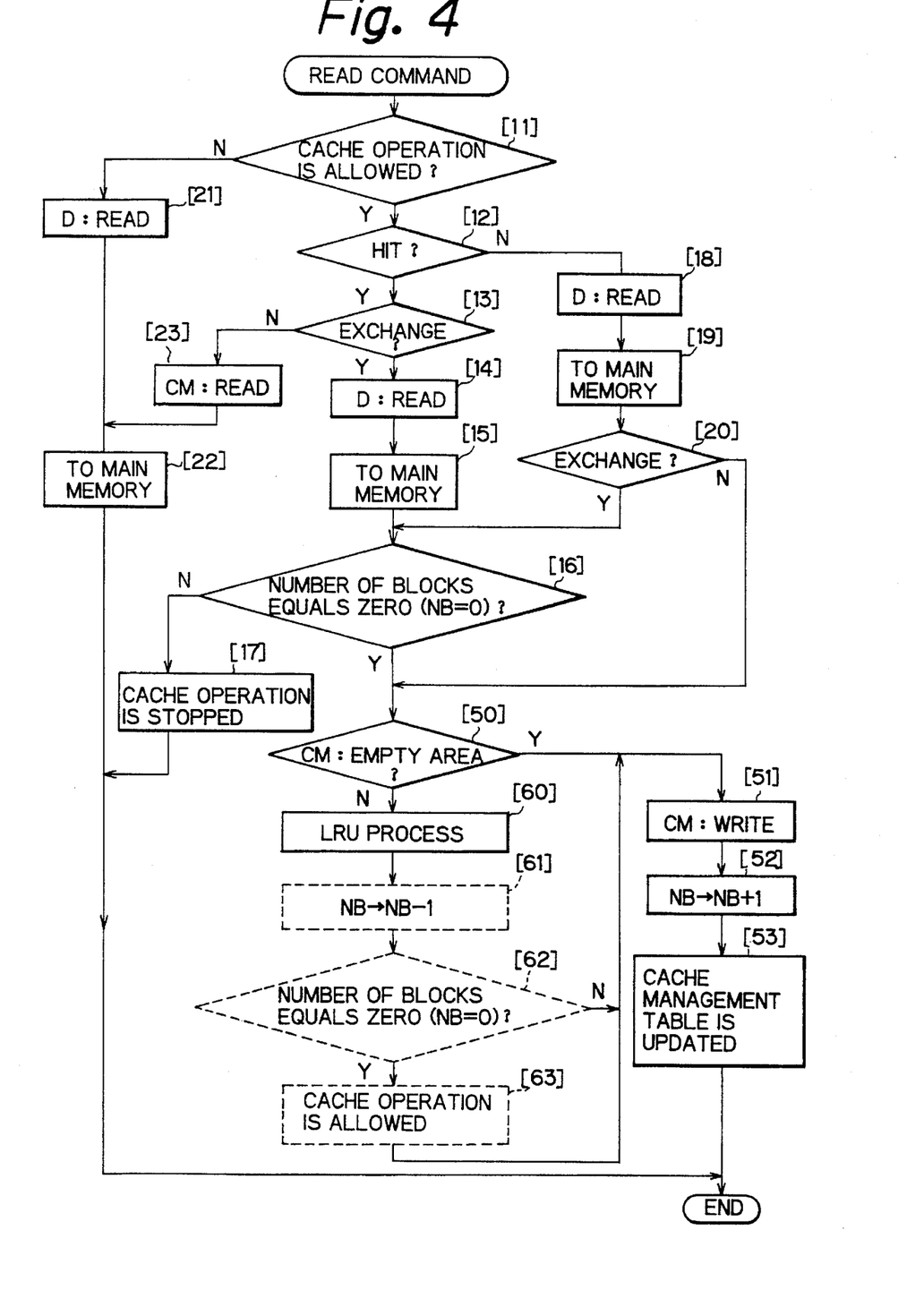
FIG. 4 is a flowchart useful for explaining an example of the operation for a read instruction in the first embodiment of the present invention.
Figure 5:
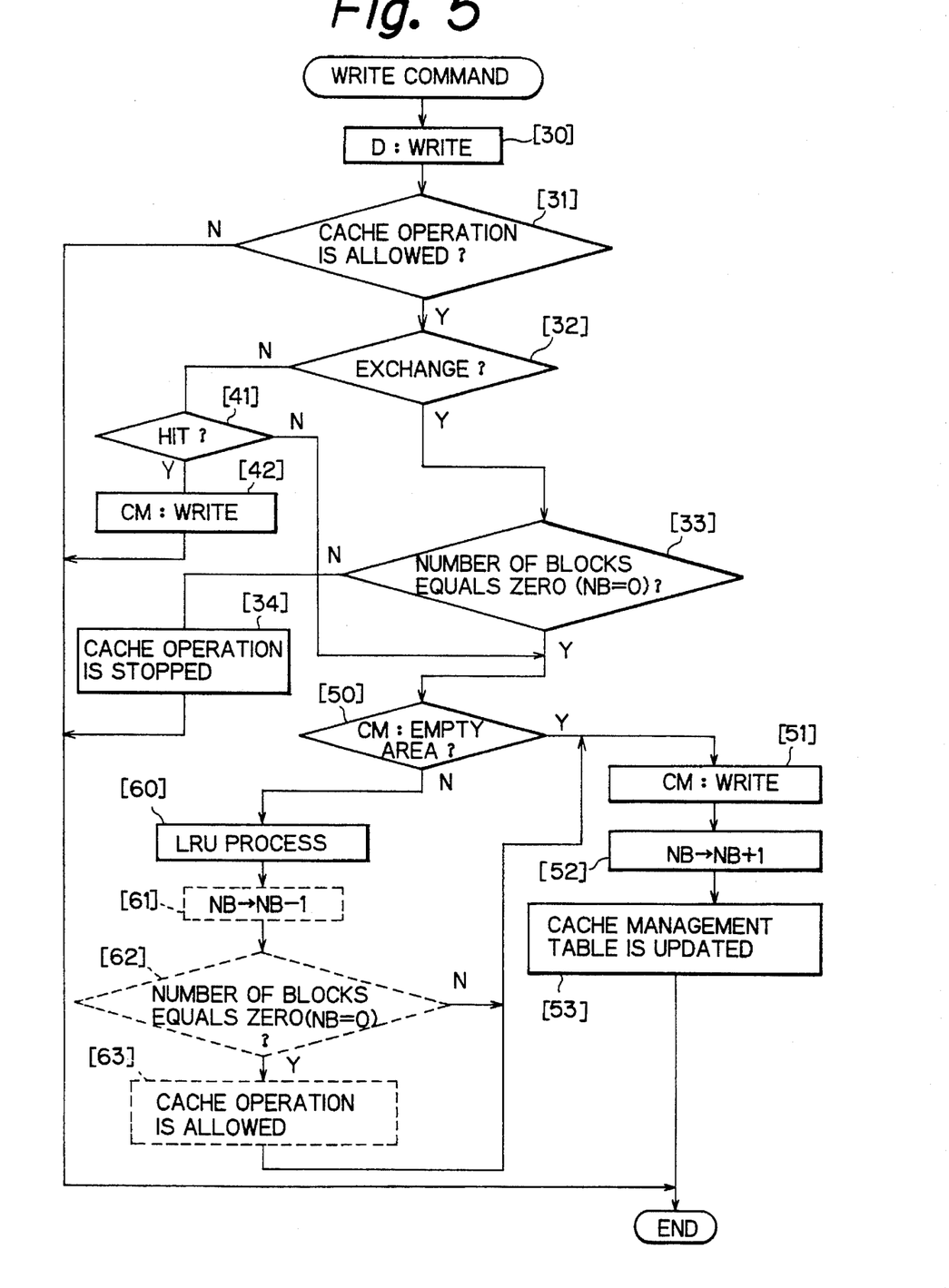
FIG. 5 is a flowchart useful for explaining an example of the operation for a write instruction in the first embodiment of the present invention.

The circuit construction of the first embodiment of the present invention shown in FIG. 3 is fundamentally similar to the block diagram of FIG. 2, and the explanation will be further given with reference to the flowcharts of FIGS. 4 and 5 and to FIGS. 6(a) to 6(c) which are conceptual views each showing the memory content of the tables 6, 7 and 8.

It will be assumed in the following description that the storage media D of the external storage devices $9_1$ and $9_m$ are not exchanged but the storage medium of the external storage device $9_2$ is exchanged from $D_1$ to $D_2$.

FIG. 4 is a flowchart showing the processing of the cache control unit 5 when the read command arrives from the CPU 2 in this embodiment. At step [11], the flag of the cache allowance table 7 (see FIG. 6(b)) corresponding to the external storage device indicated by the read command is looked up, and whether or not the cache function for this external storage device is permitted is judged.

When the cache function is stopped, the required data is read out from the external storage device designated at Step [21], and this data is transferred to the main memory 3 at Step [22] to complete the processing. When the cache function is judged as being permitted at Step [11], the flow proceeds to Step [12], and whether the requested data is stored ("hit") or not ("is not hit") in the cache management table 6 (see FIG. 6(a); symbols C, H and S represent the cylinder number, the head number and the sector number, respectively, for convenience sake) is judged.

It if is "hit", whether the storage medium D is exchanged is detected at Step [13]. The detection method in this case may be the method which sends a sense command to the external storage device 9 and acquires the storage medium exchange information from this external storage device $9_2$, or the method which sends the storage medium exchange information from the external storage device $9_2$ to the cache control unit 5 at the time of the exchange of the storage medium 5, and stores the exchange operation of the storage medium of the external storage device $9_2$ by the cache control unit 5. By the way, a method of detecting the exchange of the storage medium on the side of the external storage device 9 may be the one which uses ON/OFF of the power supply at the time of the exchange of the storage medium on the side of the external storage device.

When this Step [13] judges that the memory medium is not exchanged, the requested data is read out from the cache memory 4 at Step [23], and is transferred to the main memory 3 at Step [22] to complete the process.

When the requested data is not stored in the cache memory 4 and the flow does not "hit" at Step [12], the requested data is read out from the external storage device 9 at Step [18] and is transferred to the main memory 3 at Step [19]. At the next Step [20], the exchange of the storage medium D is detected in the same way as the method employed at Step [13].

When this Step [20] judges that the memory medium is not exchanged, the flow proceeds to Step [50] in order to execute a write process to the cache memory 4. Incidentally, this write processing will be explained elsewhere. The process described above is substantially the same as the process in the prior art system, wherein the exchange of the storage medium is not effected in the external storage device, with the exception that the judgement of the exchange of the storage medium is judged.

However, when the storage medium is judged as being exchanged at Step [20], the flow proceeds to Step [16], where the table 8 of the number of blocks (see FIG. 6(c)) is looked up and the presence/absence of the data block(s) stored from the external storage device, for which the recording medium is exchanged, into the cache memory 4 is discriminated from the number of the data blocks.

When the data read out from this external storage device $9_2$ is stored in the cache memory 4, the cache function is stopped at Step [17] so as to avoid the mixture of the data of the recording medium $D_1$ before the exchange with the data cached from the recording medium $D_2$ after the exchange.

By the way, when the exchange of the recording medium is detected at Step [13] under the state where the cache function is permitted and moreover, where the result of retrieval of the cache management table 6 is "hit", the requested data is read out from the external storage device $9_2$ for which the recording medium is exchanged, at Step [14], and is then transferred to the main memory 3 at Step [15].

When the table 8 of the number of blocks is looked up and the data read out from the external storage device $9_2$ is found stored in the cache memory 4 at Step [16] described above, the cache function is stopped at Step [17]. When the data read out from the external storage device $9_2$ is not found stored in the cache memory 4, the flow proceeds to the afore-mentioned Step [50], and the write process to the cache memory 4 is executed at Step [51] or [63].

This write process to be executed when any empty space exists in the cache memory 4 stores the data, that has previously been read out from the external storage device at Step [14] or [18], into the cache memory 4 at Step [51], adds "1" to the number of blocks corresponding to the external storage device storing the data of the table 8 of the number of blocks at step [52] so as to thereby update the number of data blocks stored from this external storage device into the cache memory 4, and updates the cache data associated with the data block afresh stored in the cache management table 6 at the next Step [53].

However, when no empty space exists in the cache memory, the data block which has not been accessed for the longest period among the data blocks stored in the cache memory 4 is erased or substituted at Step [60], and then "1" is subtracted from the number of data blocks of the external storage device that has stored the data block, which is purged by the purging process at Step [60], such as the external storage device $9_1$, for example, in the table 8 of the number of blocks, so that the number becomes coincident with the number of the data blocks stored in the cache memory 4.

When Step [62] detects that the number of the data blocks of the table of the number of blocks corresponding to this external storage device $9_1$ becomes "0" as a result of this substraction, it means that the data stored from this external storage device $9_1$ into the cache memory 4 does not exist.

Under such a condition, there is no problem even when the cache function is made effective immediately after the storage medium of this external storage device $9_1$ is exchanged. Accordingly, the cache function for this external storage device $9_1$ is restored by leaving the invalid flag as such if the invalid flag of the cache allowance table 7 corresponding to this external storage device $9_1$ is not set from the beginning, and by resetting the invalid flag when it is set.

However, when the number of blocks of the table 8 of the number of blocks for this external storage device $9_1$ is more than "1" at Step [62], it means that the data stored from the external storage device $9_1$ into the cache memory 4 exists. Therefore, there is the possibility that the data cached from the storage medium before the exchange is transferred to the main memory 3 when the storage medium of this external storage device $9_1$ is exchanged. If the invalid flag is not set, therefore, the stop state of the cache function is maintained.

These Steps [61] to [63] may be the processing for the external storage device indicated by the read command in some cases, but the external storage devices storing the data blocks which are purged irrelevantly to the external storage device as the object of the read command are the object of the process. For this reason, these Steps [61] to [63] are indicated by dotted frames.

FIG. 5 is a flowchart showing the process when the write command arrives from the CPU 2 in this embodiment. When this write command arrives, the data transferred from the main memory 3 is written into the designated external storage device at Step [30].

Whether or not the cache function is permitted to this external storage device is judged at Step [31], and the flow is completed as such if the cache function is stopped. When the cache function is permitted, in the other hand, the flow proceeds to Step [32], and whether or not the storage medium of this external storage device is exchanged is detected by the same method as the method explained about the Step [13] of the read command.

When the storage medium is not exchanged, whether or not the data, to which write is instructed, is hit is judged by looking up the cache management table 6, and if the retrieval is hit, the data previously stored is updated at Step [42]. If it is not hit, the flow proceeds to Step [50] for writing afresh this data.

When the Step [32] judges that the storage medium is exchanged, the number of blocks stored from this external storage device into the cache memory 4 is read out by looking up the table 8 of the number of blocks. When the number of blocks is "0", the flow proceeds to Step [50] so as to write this data. When the number of blocks is not "0", on the other hand, the cache function for this external storage device is stopped at Step [34] so as to prevent the mixture of the data from the storage medium before the exchange and the data from the storage medium after the exchange on the cache memory.

The write process into the cache memory 4 at Steps [50] et seqq., and the updating process with this write process are the same as the process explained with reference to Steps [50] et seq in FIG. 4. Accordingly, their explanation will be omitted.

As described above, the first embodiment of the present invention can automatically restore the cache function for the external storage device, for which the storage medium is exchanged, by merely adding the cache allowance table and the table of the number of blocks, without changing the construction of the cache management table, while preventing the erroneous operation of the cache function by the exchange of the storage medium.

It is further possible according to this embodiment to always stop the cache function for the external storage device, for which the storage medium is exchanged, and to prevent the erroneous operation of the cache function due to the exchange of the storage medium by deleting the table 8 of the number of blocks from this embodiment, omitting the judgement of the number of blocks at Step [33] in the flowchart at the time of read shown in FIG. 4 and at Step [33] in the flowchart at the time of write in FIG. 5, and shifting the flow from these Steps [16], [33] to Steps [17], [34].

Figure 6:
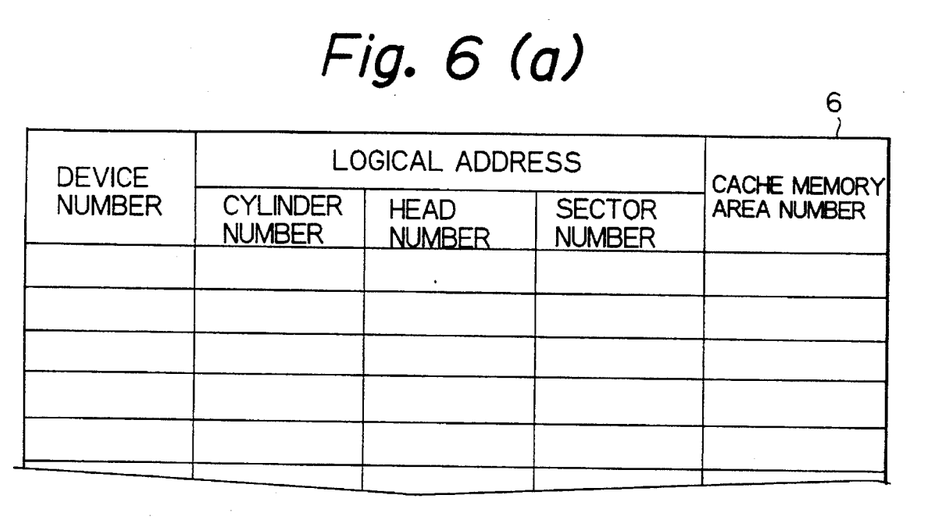
FIG. 6(a) is a conceptual view showing the content of a cache management table in the first embodiment of the present invention.
FIG. 6(b) is a conceptual view showing an example of the content of a cache allowance table in the first embodiment of the present invention.
FIG. 6(c) is a conceptual view showing an example of the content of a table of the number of blocks in the first embodiment of the present invention.
Figure 7:
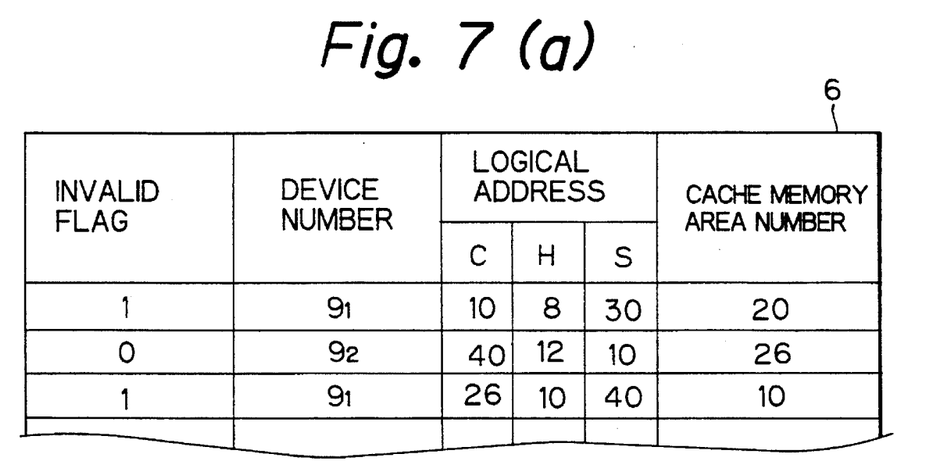
FIG. 7(a) is a conceptual view showing an example of the content of the cache management table in a modified example of the first embodiment of the present invention.
FIG. 7(b) is a conceptual view showing an example of the content of a table of the number of blocks in the modified embodiment of the first embodiment of the present invention.

Also, the cache function can always be stopped for the external storage device, for which the storage medium is exchanged, by disposing a memory position for storing the invalid flag for each cache information in the cache management table 6, and using this invalid flag of the cache management table 6 in place of the invalid flag of the cache allowance table 7 (FIG. 6(*b*)) of the afore-mentioned first embodiment when the judgement of cache allowance and the stop or allowance state of the cache function is discriminated and set. Incidentally, it becomes possible in this case to discriminate and set the invalid flag by retrieving the cache management table 6, as represented by a modified embodiment shown in FIG. 7(*a*).

Further, it is possible to reset the invalid flag set to the cache memory table 6 and to recover the cache function for the external storage device in the same way as in the first embodiment by using the cache allowance table 7 shown in FIG. 6(*b*), on the premise that the data stored from the external storage device into the cache memory does not exist. For ready reference, the table 8 of the number of blocks is shown in FIG. 7(*b*), and this structure is the same as the structure shown in FIG. 6(*b*).

However, in the first embodiment described above, the cache function for the external storage device $9_2$ cannot be rendered effective before the data cached from the storage medium $D_{21}$ before exchange, which is extracted from the external storage device $9_2$, disappears from the cache memory 4. Accordingly, there remains the problem that the processing time is elongated because it takes a time for the CPU 2 to obtain the requested data during the period in which the cache function for this external storage device $9_2$ becomes effective.

Figure 8:
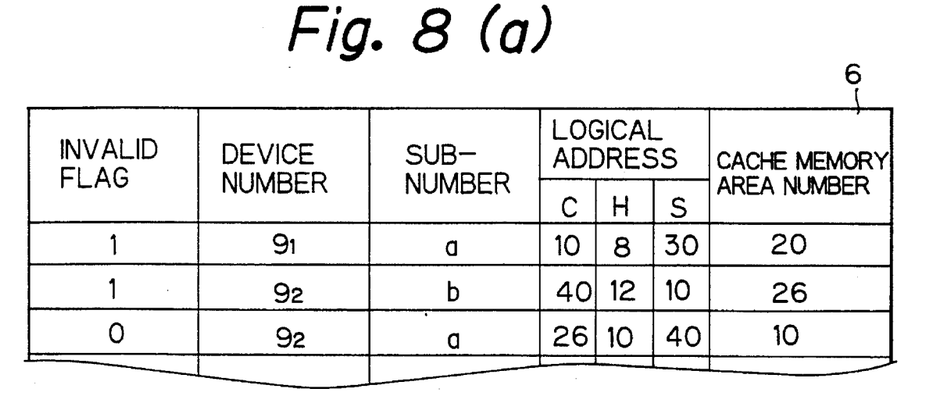
FIG. 8(a) is a conceptual view showing an example of the content of the cache management table in the second embodiment of the present invention.
FIG. 8(b) is a conceptual view showing an example of the content of a table of the number of blocks in the second embodiment of the present invention.
FIG. 8(c) is a conceptual view showing an example of the content of a cache allowance table in the second embodiment of the present invention.

Therefore, the second embodiment of the present invention provides an improved system which can render the cache function effective immediately after the exchange of the storage medium for the external storage device $9_2$ for which the storage medium is exchanged. As shown in FIG. 8(*a*), an area for storing the sub-number is secured in the cache management table 6 in addition to the external storage device number, the sub-number of the external storage device is sequentially changed by the cache control unit 5 whenever the storage medium of the external storage device $9_2$ is exchanged, in such a manner as to change the set of the device number of the sub-number to $9_{2-a}$, $9_{2-b}$, $9_{2-c}$, . . . , and the set of the device number and the sub-number is processed as being equivalent to the device number in the afore-mentioned prior art example or in the first embodiment of the present invention.

In the example of the cache management table shown in FIG. 8(*a*), the cache information of the second row is the cache information about the data cached after the exchange of the storage medium, and the cache information of the third row is the cache information about the data cached before the exchange of the storage medium. Accordingly, its sub-number is represented by a.

According to this arrangement, the set of the device number and the sub-number of the external storage device before the exchange of the storage medium is different from the set of the device number and the sub-number of the external storage device after the exchange of the storage medium. Therefore, they are apparently handled as separate external storage devices, so that the erroneous operation does not occur even when the cache function is rendered effective immediately after the exchange of the storage medium.

In this case, however, a new sub-number must be prepared whenever a storage medium is exchanged. Accordingly, when a new number is always used as the sub-number, the sub-numbers must be prepared in such a manner as to correspond to the expected maximum number of times of the exchange of the storage medium. For this reason, the digit number of the sub-numbers becomes so great and resources might be used in vain.

Therefore, there is disposed the table 8 of the number of blocks having the block number memory area for storing the number of data blocks stored in the cache memory 4 in such a manner as to correspond to the sets of the device number and the sub-number as shown in FIG. 8(*b*). In the same way as the explanation given on the table of the number of blocks in the first embodiment, "1" is added to the memory area corresponding to the set of the device number and the sub-number when the data block is stored from the external storage device to the cache memory 4, and "1" is subtracted from the memory area corresponding to the set of the device number and the sub-number of the corresponding external storage device when the data block stored in the cache memory 4 is purged out from the cache memory 4 by the purging process.

Here, if the set of the device number and the sub-number, in which the number of the stored data blocks is "0", that is, the set of the device number and the sub-number not having the data blocks stored in the cache memory 4, is used as a new set of the device number and the sub-number after the exchange of the storage medium, the number of sub-numbers to be prepared, and hence the number of the memory areas of the table of the number of blocks itself, can be reduced extremely.

Further, the cache allowance table 7 having a plurality of memory areas a, b, c, . . . corresponding to each external storage device is disposed as shown in FIG. 8(*c*), and the flag representing effectiveness/invalidity of the cache function to each set of the device number and the sub-number is set, as shown in FIG. 8(*c*). According to this construction, the process similar to the processing described above can be executed by the cache management table not having the invalid flag memory area (FIG. 6(*a*); first embodiment) or that of the prior art example, in place of the cache management table shown in FIG. 8(*a*).

According to this construction, it is not necessary to retrieve the set of the external storage device and the sub-number, for which the storage medium is exchanged, about the cache information of the cache management table when the storage medium is exchanged, and to set the invalid flat to the cache information of this set, as has already been explained with reference to the afore-mentioned first embodiment. Accordingly, this embodiment provides the advantage that the process can be further simplified.

As described above, the preferred embodiments of the present invention can prevent the erroneous operation resulting from the mixture of the data stored in the cache memory before the exchange of the storage medium and the data stored in the cache memory after the exchange, when the storage medium of the external storage device is exchanged. Furthermore, these embodiments provide the remarkable advantage that the cache operation for this external storage device can be carried out immediately after the exchange of the storage medium.

While the present invention has been described as related to the preferred embodiments, it will be understood that various changes and modifications may be made without departing from the spirit and the scope of the invention as hereinafter claimed.

We claim:

1. A cache system of external storage devices capable of exchanging a storage medium, comprising:

external storage devices each capable of exchanging a storage medium;

medium exchange detection means for detecting exchange of said storage medium;

a cache memory for storing data blocks read out from said external storage devices; and cache control means for controlling said cache memory, including a cache management table for storing items of cache information about said data blocks stored in said cache memory;

a cache allowance table having an invalid flag area for storing invalid flags, each representing effectiveness/invalidity of a set of data blocks in the cache memory read from the storage medium in a corresponding external storage device, each invalid flag set to indicate invalidity of the set of data blocks stored from the corresponding external storage device when said medium exchange detection means detects the exchange of said storage medium therein; and means for retrieving a requested data block from said cache memory based on said cache information in said cache management table when an access instruction to one of said external storage devices arrives matching one of the items of said cache information in said cache management table unless a corresponding invalid flag is set to indicate invalidity of the requested data block.

2. A cache system of external storage devices capable of exchanging a storage medium according to claim 1, wherein said cache control means further comprises:

purging processing means for sequentially purging older data blocks when said cache memory becomes full to enable said cache memory to store new data blocks; and a number of blocks table, coupled to said purging processing means, having block number areas for recording a number of data blocks stored from each of said external storage devices in said cache memory, said purging processing means incrementing the number of data blocks stored in a corresponding block number area when each of said data blocks is stored in said cache memory, said purging processing means decrementing the number of data blocks stored in the corresponding block number area for each purged data block, and when the number of data blocks is zero, said purging processing means resetting said invalid flag for the corresponding external storage device in said cache allowance table.

3. A cache system of external storage devices capable of exchanging a storage medium, comprising:

external storage devices each capable of exchanging a storage medium;

medium exchange detection means for detecting exchange of said storage medium;

a cache memory for storing data blocks read out from said external storage devices; and cache control means for controlling said cache memory, including a cache management table for storing items of cache information about said data blocks stored in said cache memory, including a sub-number for each item of said cache information in said cache management table, and when said medium exchange detection means detects the exchange of said storage medium in a corresponding external storage device, a different sub-number is included in a new item of said cache information for the corresponding external storage device, is associated with a device number of the corresponding external storage device and stored in a sub-number area; and means for retrieving a requested data block from said cache memory based on said cache information in said cache management table when an access instruction to one of said external storage devices arrives matching one of the items of said cache information including the device number and the sub-number thereof.

4. A cache system of external storage devices capable of exchanging a storage medium, according to claim 3, wherein said cache control means further includes:

purging processing means for sequentially purging older data blocks when said cache memory becomes full to enable said cache memory to store new data blocks; and a number of blocks table, coupled to said purging processing means, having block number areas for storing a number of the data blocks stored from the corresponding external storage device to said cache memory during a period when a single storage medium has supplied all of the data blocks corresponding thereto, each block number area corresponding to the external storage device number and sub-number for a corresponding storage medium, said purging processing means incrementing the number of data blocks stored in a corresponding block number area when each of said data blocks is stored in said cache memory, and decrementing the number of data blocks stored in the corresponding block number area when each of said data blocks is purged from said cache memory by said purging processing means, and when the number of said data blocks is zero, the corresponding block number area is available for use by a different storage medium in the corresponding external storage device.

* * * * *